US011775921B2

(12) United States Patent
Martin, Jr. et al.

(10) Patent No.: US 11,775,921 B2
(45) Date of Patent: Oct. 3, 2023

(54) SYSTEM AND METHOD FOR TRANSPORTATION MANAGEMENT

(71) Applicant: Cogent Logistics, Goshen, IN (US)

(72) Inventors: William James Martin, Jr., Goshen, IN (US); Angela Blough, Middlebury, IN (US); Arthur James Hicks, Jr., Goshen, IN (US); Thomas Franklin Smith, Osceola, IN (US)

(*) Notice: Subject to any disclaimer, the term of this patent is extended or adjusted under 35 U.S.C. 154(b) by 0 days.

(21) Appl. No.: 17/834,830

(22) Filed: Jun. 7, 2022

(65) Prior Publication Data

US 2022/0391837 A1 Dec. 8, 2022

Related U.S. Application Data

(60) Provisional application No. 63/197,978, filed on Jun. 7, 2021.

(51) Int. Cl.
*G06Q 10/0833* (2023.01)
*G06Q 10/1091* (2023.01)
*G06Q 10/0631* (2023.01)

(52) U.S. Cl.
CPC ... *G06Q 10/0833* (2013.01); *G06Q 10/06311* (2013.01); *G06Q 10/1091* (2013.01)

(58) Field of Classification Search
CPC ......... G06Q 10/0833; G06Q 10/06311; G06Q 10/1091
USPC ...................................................... 705/333
See application file for complete search history.

(56) References Cited

U.S. PATENT DOCUMENTS

2016/0104107 A1* 4/2016 Disorbo ............... G06Q 10/087 705/28
2020/0151816 A1* 5/2020 Simpson ............... G06Q 50/30

OTHER PUBLICATIONS

"Applications of GPS technology in the land transportation system" Published by Elsevier (Year: 2004).*

* cited by examiner

*Primary Examiner* — Zeina Elchanti
(74) *Attorney, Agent, or Firm* — C. John Brannon; Brannon Sowers & Cracraft PC

(57) ABSTRACT

A system and method for transport management includes a back-end system controlling a display depicting real-time location tracking for drivers or commodities requiring location tracking, route status tracking for driveaway vehicles and towable unites, and freight using a location tracking device including a GPS device connected to a cloud-based infrastructure. A server of the back-end system executes a plurality of modules including at least: a trip management module configured to facilitate control of a trip, including request of the trip by a driver and assignment of the trip to the driver by the back-end system; a driver management module configured to facilitate control of driver operations, including canceling the trip or abandoning a trip and notifying the driver via the end-user device; and a settlement management module configured to facilitate settlement or completion of the trip, including submission of inspection documents of the freight or the transportation vehicle before the trip begins and after the trip has ended. Units are also monitored by utilizing geo fences to monitor zones where units are stored, managed, serviced, and inspected.

8 Claims, 17 Drawing Sheets

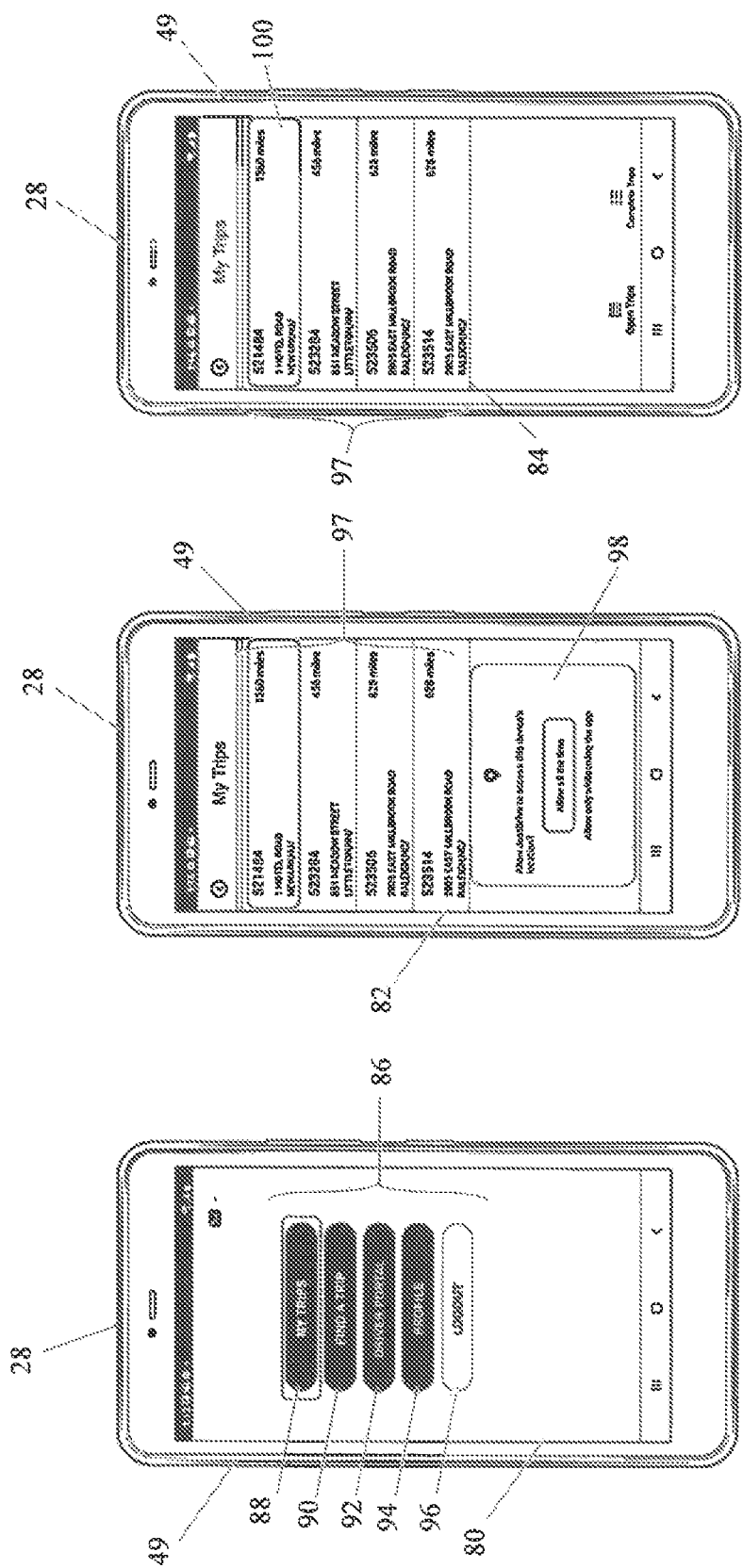

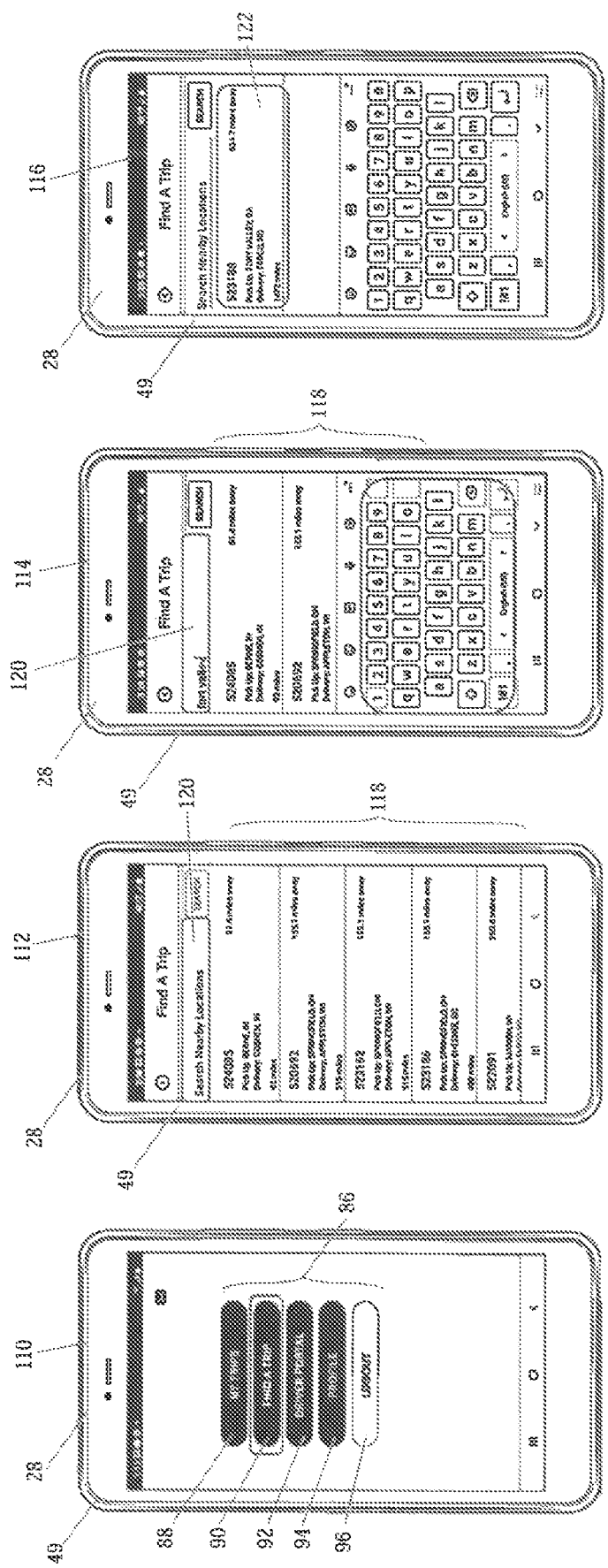

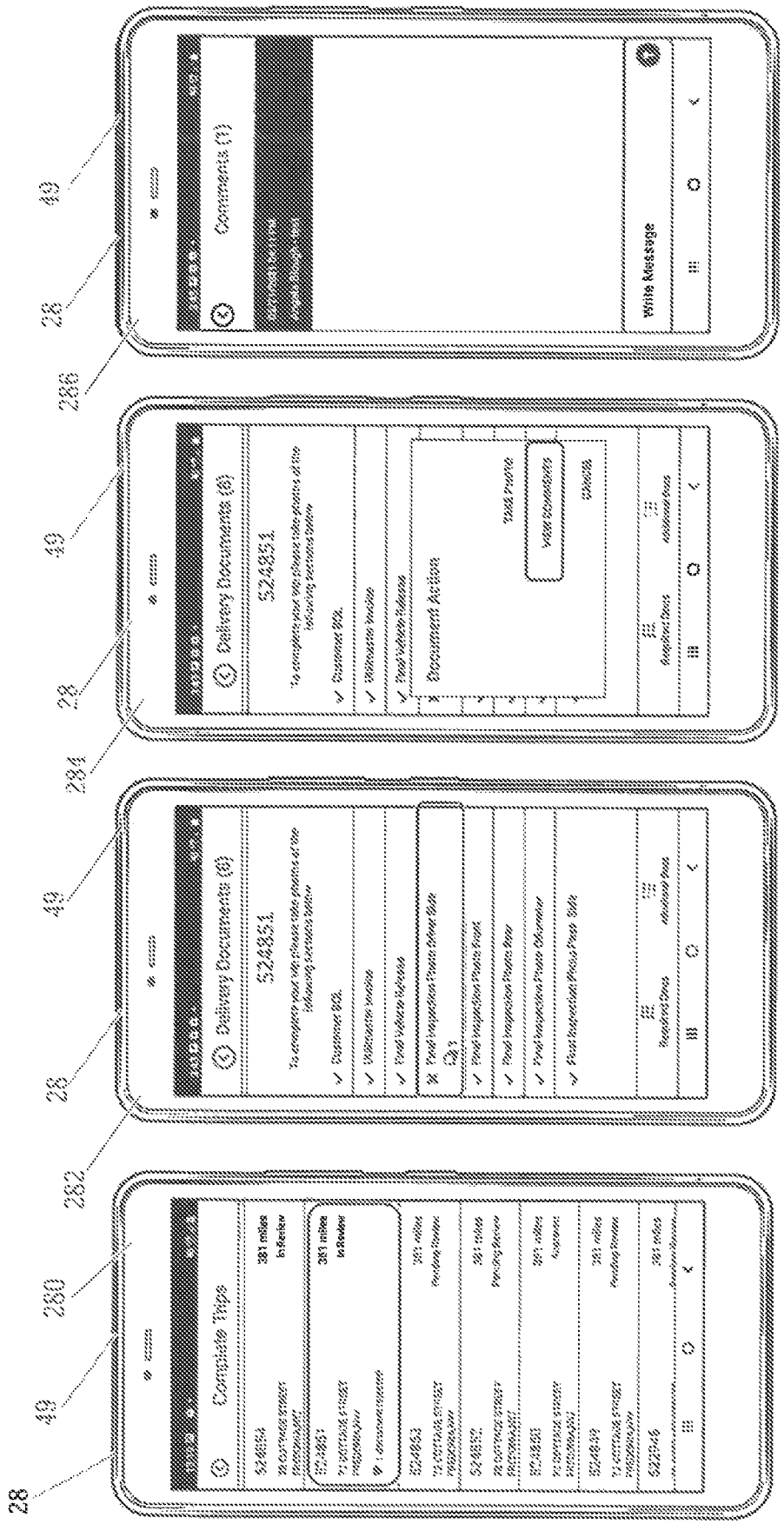

SYSTEM AND METHOD FOR TRANSPORTATION MANAGEMENT

CROSS-REFERENCE TO RELATED APPLICATIONS

This patent application claims priority to U.S. Provisional Patent Application Ser. No. 63/197,978, filed on Jun. 7, 2021.

BACKGROUND

Transportation companies are faced with moving a variety of different freight for a variety of different customers between multiple locations, Tracking and managing such operations, including, for example, management of drivers, customers, order, and trips, can be challenging. Accordingly, it is important that the transportation companies strive to schedule the movement of freight in an effective and efficient manner to provide a high-quality service.

The present novel technology addresses this need.

SUMMARY

Certain aspects of the invention are directed generally toward transportation management processes and systems. For example, certain aspects of the present invention are directed toward a method in a computer system for determining one or more routes for transporting items, including receiving multiple orders to transport items from an origination stop to a destination stop, Each order can have an associated time attribute and an associated physical attribute.

BRIEF DESCRIPTION OF THE DRAWINGS

FIGS. 2, 3, 4 show different screen captures of an end-user device for a driver, displaying details of trips assigned or otherwise associated with the driver;

FIGS. 5, 6, 7, 8 show different screen captures of the end-user device for a driver, displaying available trips;

FIGS. 33, 34, 35, 36 show different screen captures of the end-user device for a driver, displaying a process for completing a trip and submitting delivering documents;

DETAILED DESCRIPTION

Before the present methods, implementations, and systems are disclosed and described, it is to be understood that this invention is not limited to specific implementations, and as such may, of course, vary. It is also to be understood that the terminology used herein is for the purpose of describing particular implementations only and is not intended to be limiting.

As used in the specification and the claims, the singular forms "a," "an" and "the" include plural references unless the context clearly dictates otherwise. Ranges may be expressed in ways including from "about" one particular value, and/or to "about" another particular value. When such a range is expressed, another implementation may include from the one particular value and/or to the other particular value. Similarly, when values are expressed as approximations, for example by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. Similarly, "typical" or "typically" means that the subsequently described event or circumstance often occur or often not occur, and that the description includes instances where said event or circumstance occurs and instances where it does not.

As used herein, a computer implemented method refers to a method which involves the use of a computer, computer network or other programmable apparatus, where one or more features are realized wholly or partly by means of a computer program. A non-transitory computer-readable storage medium refers to a medium having stored thereon software instructions that, when executed by a processor, cause the processor to generate control signals for executing predetermined steps.

Figure 1:
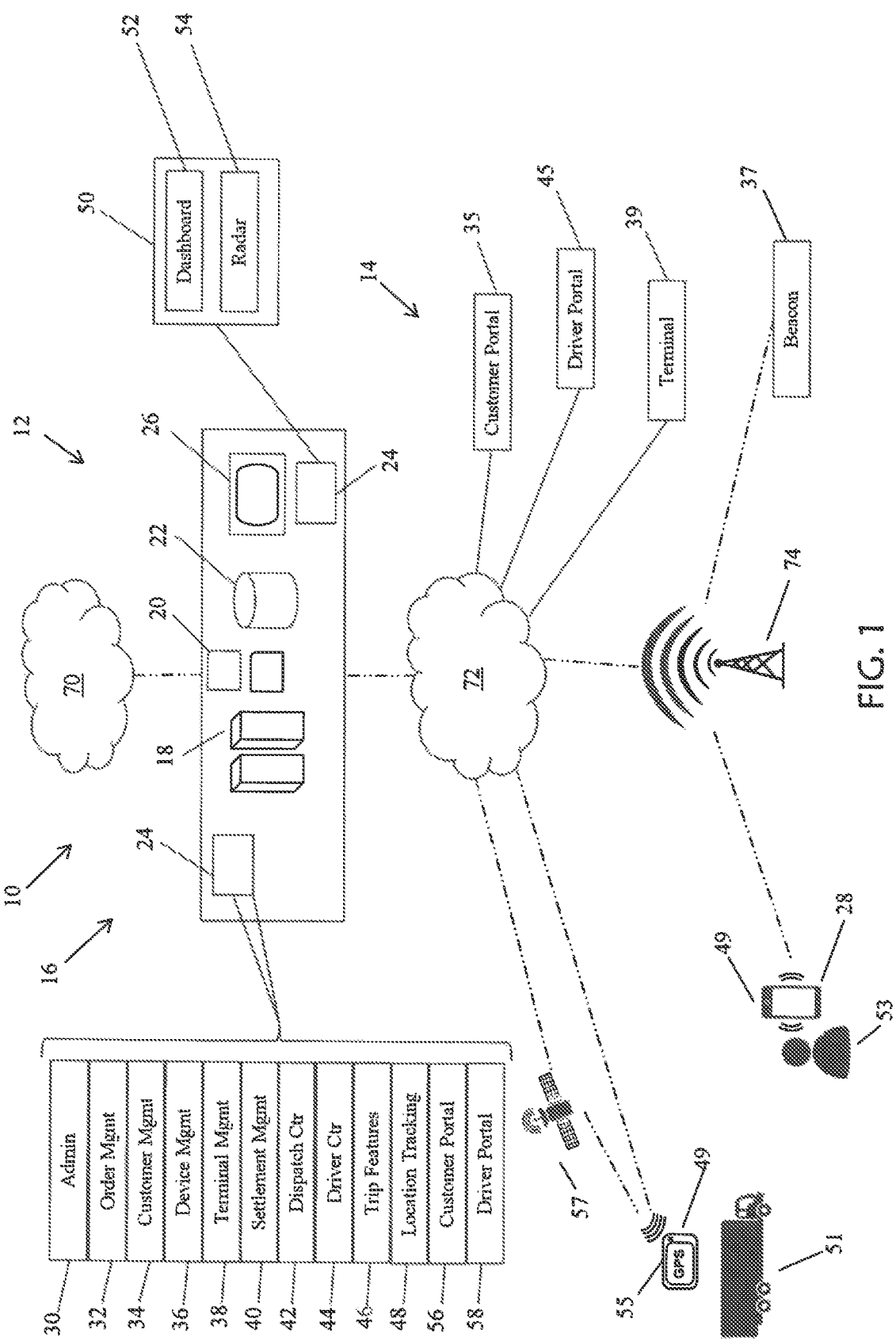
FIG. 1 shows a simplified diagram of a transportation management system for carrying out the functionality of the system and method of the present disclosure.

Depicted in FIG. 1 is a block diagram of a transportation management system 10, including a computer system 12, according to the present disclosure. The transportation management system 10 and method, in an exemplary embodiment, are configured to facilitate interactive communication between management, drivers, and customers of a transportation system. The transportation management system 10, portions of which may be referenced herein as the computer system 12, includes a plurality of different components.

The computer system 12 may generally include what is referred to as a front-end 14 and a back-end 16. The back-end 16 may generally include one or more servers 18, processors 20, databases 22, modules 24 and displays 26. The back-end 16 refers to parts of a computer application or a program's code that allow it to operate and that cannot be accessed by a user. Most data and operating syntax are stored and accessed in the back-end 16 of the computer system 12. Typically, the code is comprised of one or more programming languages.

Server 18 is a computer or system that provides resources, data, services, or programs to other computers over a network. The server 18 may include or utilize the one or more processors 20. A central processing unit, also called a central processor, main processor or just processor (20), is the electronic circuitry that executes instructions comprising a computer program. The CPU 20 performs basic arithmetic, logic, controlling, and input/output operations specified by the instructions in the program. The data storage module 22 may include memory for storing data and images, and instructions that are processed by the one or more processors 20.

The transportation management system 10 may include or use one or more modules 24 to perform various functions including, but not limited to, searching, analyzing, querying, interfacing, etc. A "module" refers to a portion of the computer system 12 and/or software program that carries out one or more specific functions and may be used alone or combined with other modules 24 of the same system or program.

For example, a module 24 may be located on the transportation management system 10 (e.g., on the servers 18 of the transportation management system, i.e., server-side module), on end user devices 28, or on an intermediary device (e.g., the client server, i.e., a client-side module; another end user device(s); a different server on the network; or any other machine capable of direct or indirect communication with, for example, systems, websites, and/or the end user devices 28.)

According to an exemplary embodiment, the transportation management system 10 may include the following modules 24:

An administration module 30 may provide or include the following functionality: staff management; ability to send invites, change passwords, assign roles, list of inactive users; manage roles and assign permissions; list of all responses that get sent upon various triggers; ability to create or edit response as needed; and management of important account settings affecting all areas of the system.

An order management module 32 may provide or include the following functionality: create and edit orders; ability to manage orders submitted by customer; sortable views of all open orders; ability to open each order for more details including trip map and nearby orders; and record of bill of ladings (BOL's) that are being sent automatically and ability to download or rerun.

A customer management module 34 may provide or include the following functionality: upper-level account management, user management, viewable as bill to's, order by's, consignees, or all, manage customers utilizing a customer portal 35; invite new users, assign consignees, reset passwords; and log in as ability to see a customer's portal view.

A device, or beacon 37, management module 36 may provide or include the following functionality: complete list of available and registered tracking devices; ability to setup available devices; ability to create zones to surround the area's devices are assigned to; live tracking of all devices; and alarm notifications when device leaves or enters a zone. System may also automatically detect zones visited to document history of possible places visited within geo zones specified through the administration module.

A notification center provides a centralized hub for all emails, SMS, Push, and Chat activity throughout the platform. It provides the ability to schedule, review, and monitor communication activity across their terminal inventory management module 38 may provide or include the following functionality: manage all terminals 39 utilized by a transportation company; manage lots available at each terminal 39; and ability to import inventory from customer.

Rate management provides advanced algorithms to estimate customer charges, and driver pay based on conditional order criteria. Rates can be linked, cloned, and distributed internally and across other enterprise environments.

A settlement management module 40 may provide or include the following functionality; see all trips that have been completed; approve or reject documentation photo provided by the driver; ability to converse with the driver; follow the history of all documented photos; location sensing on photos to ensure they were captured within a mile radius of delivery location; ability to classify and record expenses from the photo, will transfer automatically to a trip expense sheet; and can add additional, non-photo expenses to trip expense sheet; shows all trips that have final approval from a settlements department; ability to download all documents that have been captured; trip expense sheet k attached so all driver pay can be settled appropriately; ability to pay driver; and once settled trip can be marked to move to invoicing.

A dispatch center module 42 may provide or include the following functionality: various views of open orders and load boards presented to drivers; ability to open each order for more details including trip map and nearby orders; ability to create trip plans; ability to assign drivers to trips; ability to start, stop abandon, hold, or split an order; and ability to give driver advances or withdrawals.

A driver center module 44 may provide or include the following functionality; at a glance counts of active/inactive drivers and devices drivers are using; searchable list of all drivers; individual driver demographic information; active, upcoming and completed trips; driver equipment, safe miles, authorizations, and pay set up and management; ability to export driver data to Excel; manage drivers utilizing the driver portal 45, send login invite, change password; log in as any driver to see their driver portal view; list of all drivers that have enrolled in the driver portal 45; manage all the necessary documents drivers need available on the driver portal 45; ability to download copies as necessary; ability to manage driver employers; and ability to manage company owned equipment utilized by drivers.

A radar, or location tracking, module 48, described in greater detail below, may provide or include the following functionality: a plurality of tracking devices 49, which may be associated with transport vehicles 51, drivers 53, orders, etc.; real-time tracking; use of a GPS 55 and satellite 57 to determine location; display live data for trips that are currently active; visibility of all check calls; map showing the location of active trips; record all data associated with the trip; and hot links to full driver and order details.

A display module 50 may provide or include a graphical user interface for displaying, for example, dashboard 52 and/or radar 54. The dashboard 52, according to the exemplary embodiment, may display stats for driver counts, trip requests, trip statuses, dwell ratings, trip priorities, and trip ranks with clickable views that take you to compiled lists of the metric representation. The radar 54 may show live data for trips that are currently active and/or a list of tracking devices 49, and a map showing the locations of all active devices 49.

A customer portal module 56 may provide or include the following functionality, which may be accessed via the customer portal 35 interactive chart to view orders by status, order volume chart; view list of orders according to preferred filters, ability to export order list, and view individual orders for further details; instructional videos for various activities; and manage the users you want to have access to your account.

A driver portal module 58 may provide or include the following functionality, which may be accessed the driver portal 45: review of taxable earnings, pay stubs and earnings statements bond summary, mileage summary; annual safety review training, documentation drivers may need to download; list of certifications and expiration dates; list of trips available to be moved; and requesting a trip.

The transportation management system 10 may additionally or alternatively include a cloud-based system 70. Cloud-based networking is referred to as the network communication and interconnectivity between IT resources/application within a cloud computing infrastructure. It may include a processor and data storage and enables a cloud computing solution/service to interact and perform network connection with other resources on the cloud 70. Any cloud-based solution refers to applications, storage, on-demand services, computer networks, or other resources that are accessed with an internet connection through another provider's shared cloud computing framework.

The layer above the back-end 16, described above, k the front end 14 and it includes all software or hardware that k part of a user interface. Human or digital users interact directly with various aspects of the front end 14 of a program, including user-entered data, buttons, programs, websites and other features, may include one or more hardware processors 20, or central processing units, for executing one or more programs and controlling operations of one or more components consistent with the teachings herein.

The user 53 may install a program to interface with a system server to communicate data, interactions, and information to/from the user's end user device(s), such as via the internet 72 and/or another wireless communication network 74. In some other implementations, the system may be installed on a user's machine and operate, in whole or in part, independently of system WAN and/or LAN components. For example, the system software may be deployed to a user's computer as a standalone program that interfaces with the user's computer, creates and maintains data store(s), maintains/processes subscription data, maintains/processes trust linkage data, filters/transfers email, etc.

A device or other component of the transportation management system 10 of the present disclosure may comprise any combination of hardware and/or software that may interact and perform the functionality described herein. Exemplary hardware may include, without limitation, desktops or other computers (e.g., tablets, slates, etc.), database servers, network storage devices and other network devices, smart phones and other cell phones.

The end user device or mobile device 28 may include one or more hardware processors, or central processing units, for executing one or more programs and controlling operations of one or more components consistent with the teachings herein. The mobile device 28 also includes a communications module, which facilitates communications between components within and/or outside the mobile device 28. The components of the mobile device 28, and even the transportation management system 10, in general, may include or utilize multiple interacting computing systems or devices and may be connected to other devices that are not specifically illustrated, including via Bluetooth communication or other direct communication, through one or more networks such as the Internet 72, via the Web, or via one or more private networks (e.g., mobile communication networks, etc.).

Although an exemplary transportation management system 10 has been described, implementations of the subject matter and the functional operations described in this specification may be implemented in other types of digital electronic circuitry, or in computer software, firmware, or hardware, including the structures disclosed in this specification and their structural equivalents, or in combinations of one or more of them.

Embodiments of the subject matter and the operations described in this specification may be implemented as a method, in digital electronic circuitry, or in computer software, firmware, or hardware, including the structures disclosed in this specification and their structural equivalents, or in combinations of one or more of them. Embodiments of the subject matter described in this specification may be implemented as one or more computer programs, that is, one or more modules of computer program instructions encoded on computer storage medium for execution by, or to control the operation of, data processing apparatus.

The operations described in this specification may be implemented as operations performed by a data processing apparatus on data stored on one or more computer-readable storage devices or received from other sources.

FIGS. 2, 3, 4 show different screen captures 80, 82 and 84 of an end-user device 28 for the driver 53, displaying details of trips assigned or otherwise associated with the driver 53. For example, with reference to FIG. 2, the driver 53 may be presented with a menu 86 facilitating selection of "my trips" 88, "find a trip" 90, "driver portal" 92, "profile" 94, and "logout" 96. By selecting "my trips" 88, the driver 53 may be provided with a list 97 of trips assigned or associated with the driver 53. On various screens, such as that shown in FIG. 3, the driver 53 may be given the option, via a pop-up window 98 to allow the underlying program or application to access the location of the user device 28. In FIG. 4, is an illustration of the selection of a particular trip 100 to drill down and gain additional details regarding the trip 100.

FIGS. 5, 6, 7, 8 show different screen captures 110, 112, 114 and 116 of the end-user device 28 for the driver 53, displaying available trips. By selecting "find a trip" 90, the driver 53 may be provided with a list 118 of available trips for the driver 53. In FIG. 7, the driver 53 may enter search criteria at 120 to find specific trips. A selection may then be made at 122 of FIG. 8 to select a particular trip.

Figure 10:
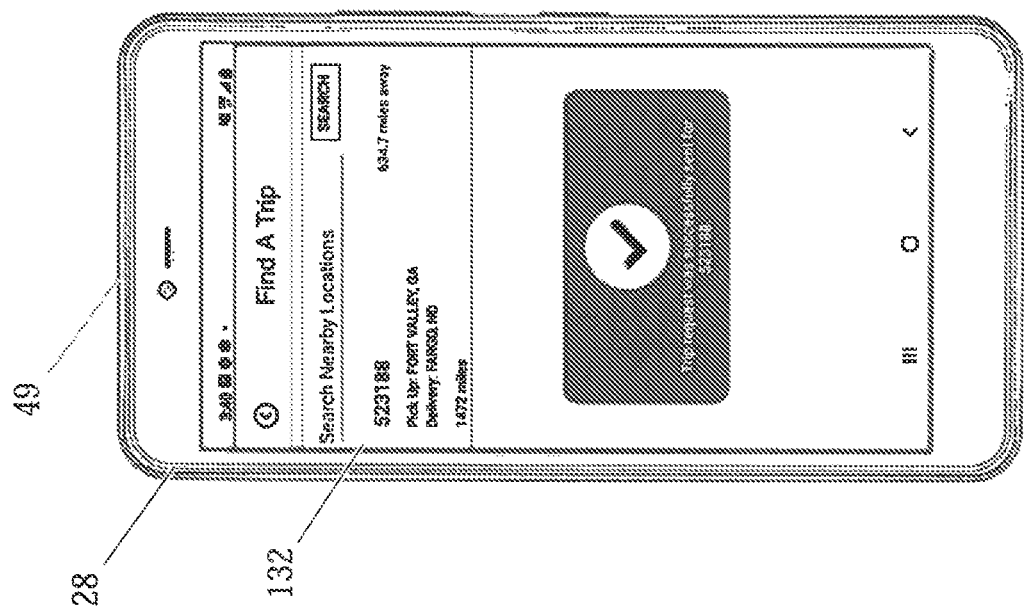
FIGS. 9, 10 show different screen captures of the end-user device for a driver, displaying the selection and request of an available trip.
Figure 9:
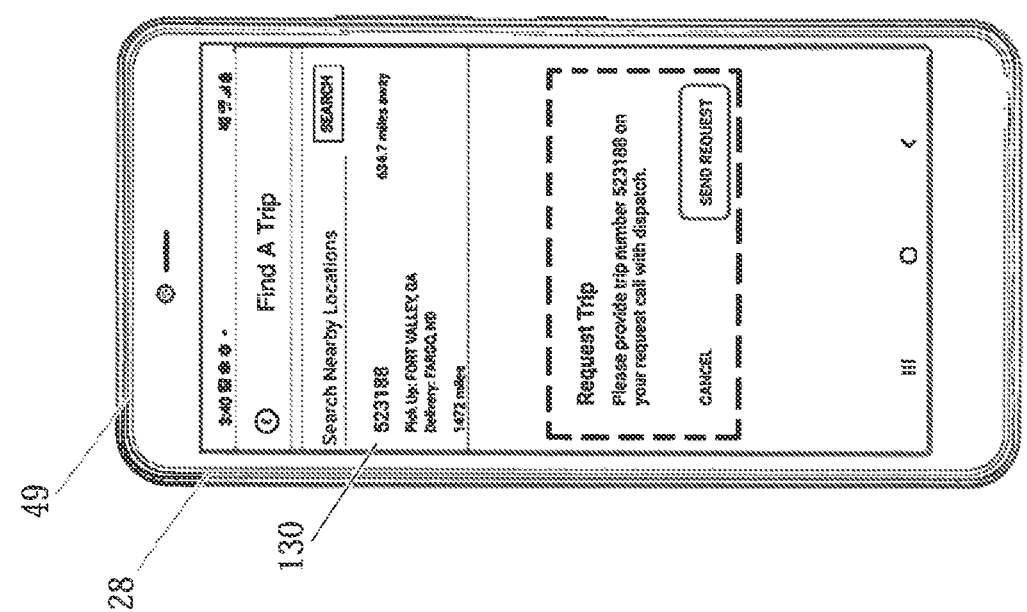

FIGS. 9, 10 show different screen captures 130 and 132 of the end-user device 28 for the driver 53, displaying the selection and request of an available trip, as shown in FIG. 9. Thereafter, the driver 53 may receive a confirmation that the request was successfully, as shown in FIG. 10.

Figure 13:
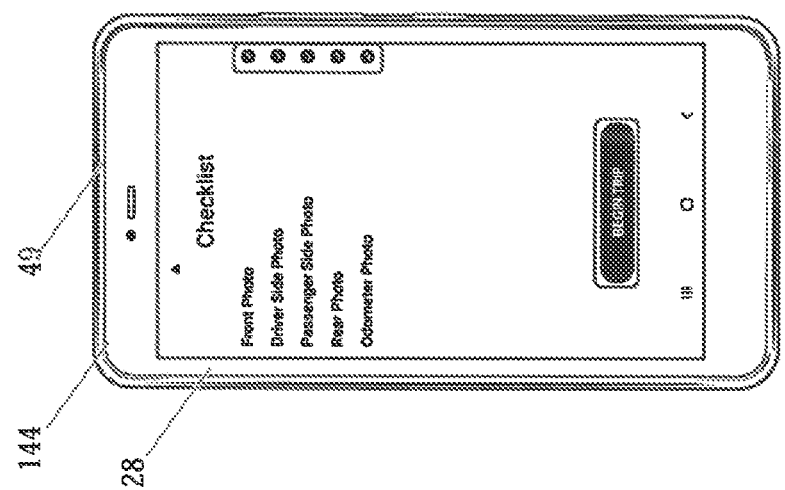
FIGS. 11, 12, 13 show different screen captures of the end-user device for a driver, displaying order details and a checklist of tasks to be completed prior to starting the trip.
Figure 12:
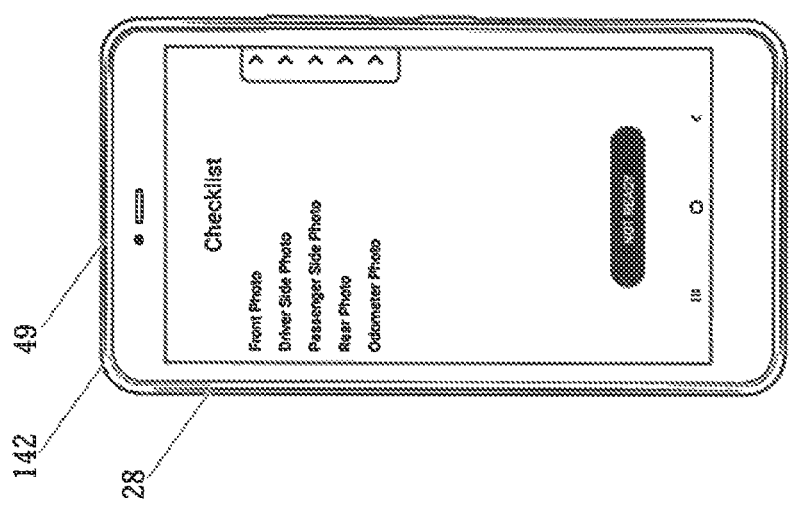
Figure 11:
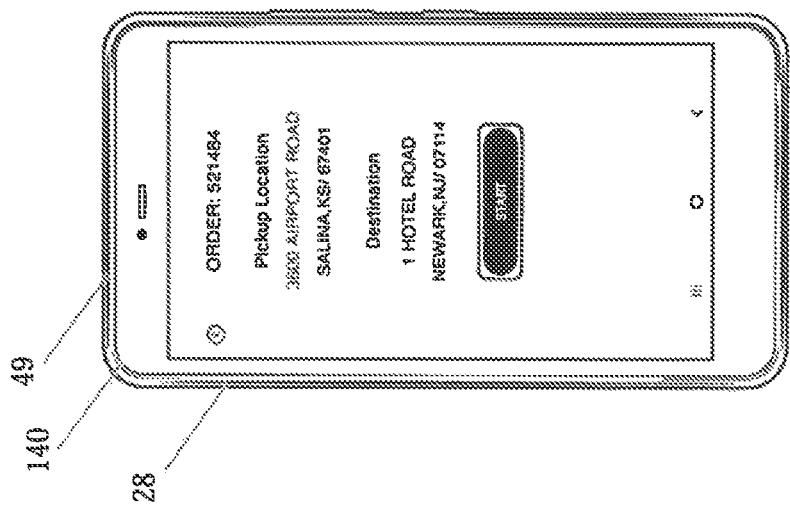

FIGS. 11, 12, 13 show different screen captures 140, 142 and 144 of the end-user device 28 for a driver 53, displaying order details and a checklist of tasks to be completed prior to starting the trip. FIG. 11 shows details of the order, while FIGS. 12 and 13 depict checklists of items to completed by the driver 53 prior to starting the trip.

Figures 14, 15, 16:
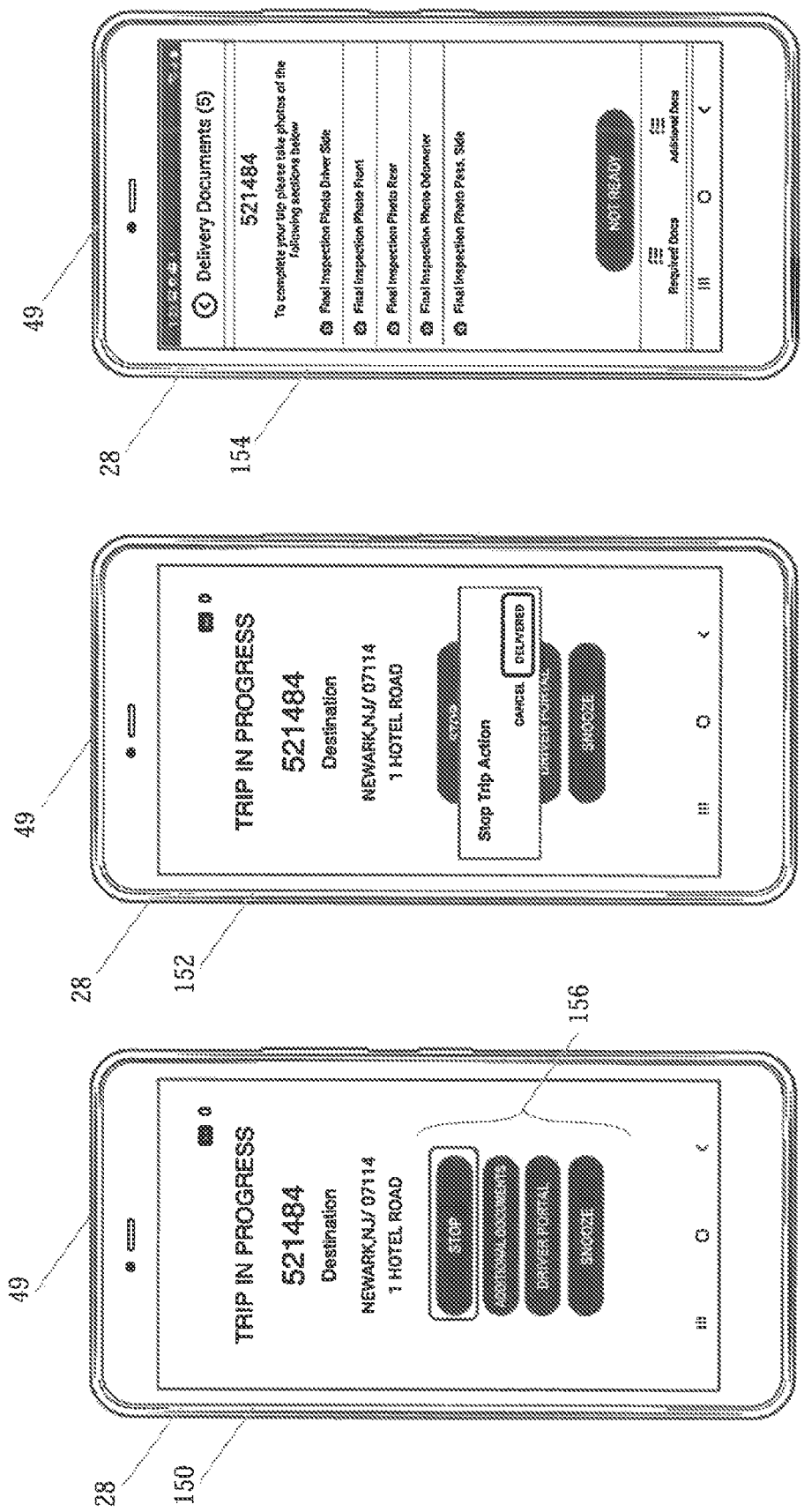
FIGS. 14, 15, 16 show different screen captures of the end-user device for a driver, displaying options available for the driver during a trip.

FIGS. 14, 15, 16 show different screen captures 150, 152 and 154 of the end-user device 28 for a driver 53, displaying options available for the driver during a trip. Options available, at 156 include: "stop," "additional documents," "driver portal," and "snooze." In FIG. 15, it can be seen that driver 53 may select an option to reflect a delivered status. After indicating a trip as completed, the driver 53 may be given the option to enter, or upload, delivery documentation, which may include photos.

Figure 18:
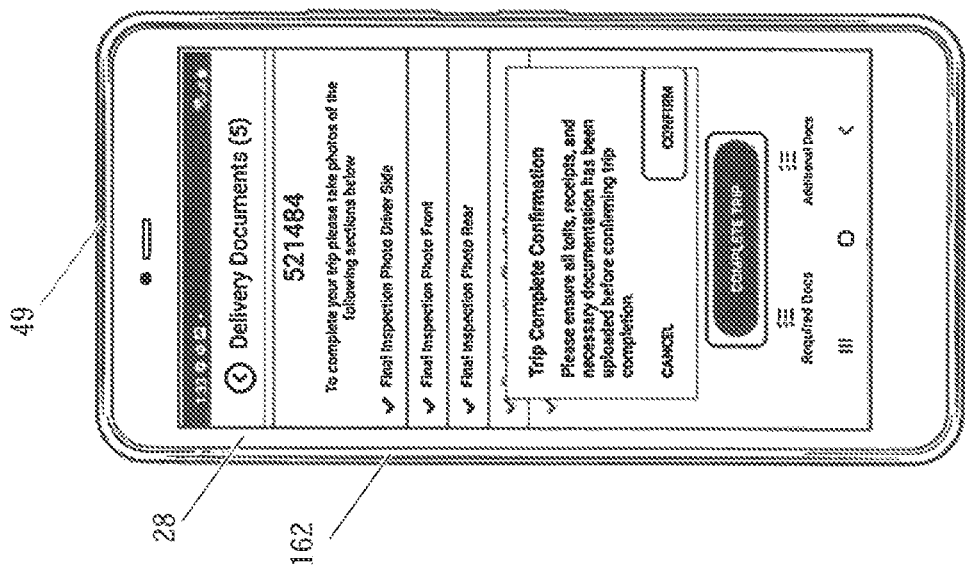
FIGS. 17, 18 show different screen captures of the end-user device for a driver while completing a trip, including facilitating a final inspection.
Figure 17:
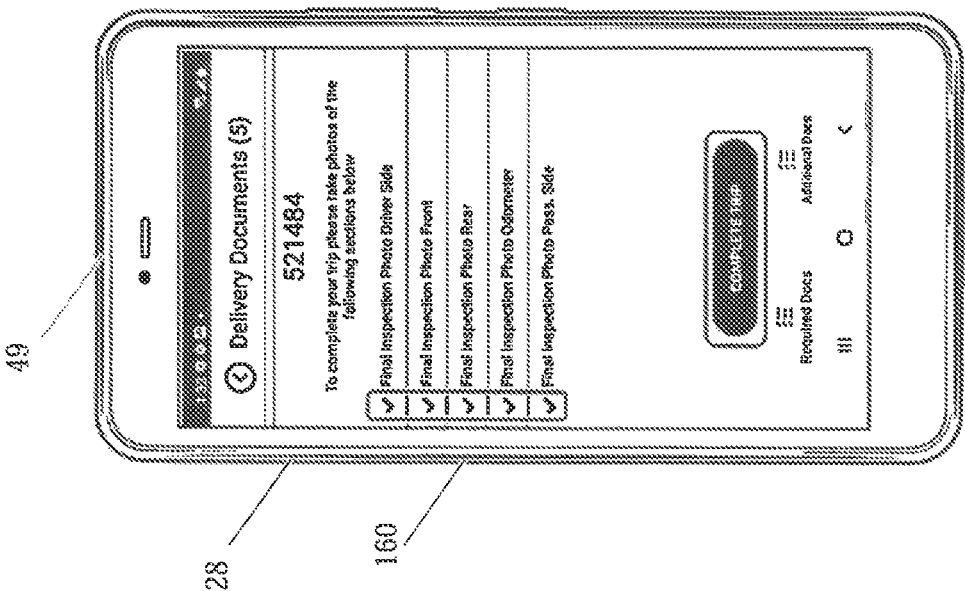

FIGS. 17, 18 show different screen captures 160 and 162 of the end-user device 28 for a driver 53 while completing a trip, including facilitating a final inspection. That is, the driver 53 may enter required documentation, used for a final inspection, prior to completing a trip.

Figures 19, 20:
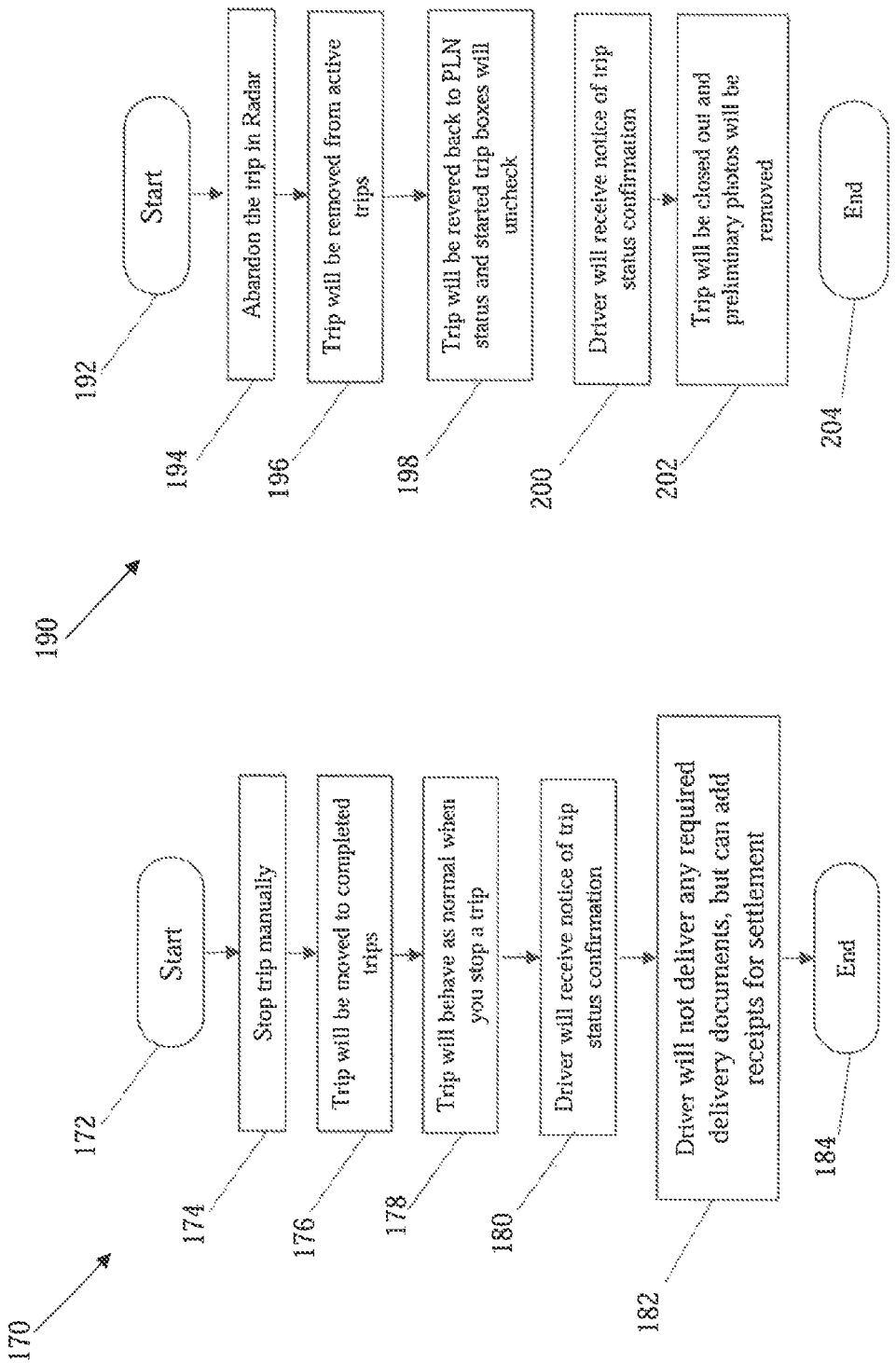
FIG. 19 shows a flow diagram illustrating a method for stopping a trip in progress.
FIG. 20 shows a flow diagram illustrating a method for abandoning a trip.

FIG. 19 shows a flow diagram 170 illustrating a method for stopping a trip in progress. The method begins at a start (box 172) and, after a trip is manually stopped through the application (box 174), the trip is moved to completed trips (176). The trip will behave as normal when a trip is stopped (box 178). The driver 53 will receive a notice of trip status confirmation, box 180, and the driver will not deliver any required delivery documents, but can add receipts for settlement, box 182. The method proceeds to an end at box 184.

FIG. 20 shows a flow diagram 190 illustrating a method for abandoning a trip, starting at box 192. A trip may be abandoned in dispatch, at box 194. In response, the trip will be removed from active trips (box 196) and will be reverted back to PLN status and started trip boxes will uncheck (box 198). At box 200, the driver 53 will receive notice of a trip status confirmation, and, at box 202, the trip will be closed out and preliminary photos will be removed. The method proceeds to an end at box 204.

Figures 21, 22, 23, 24:
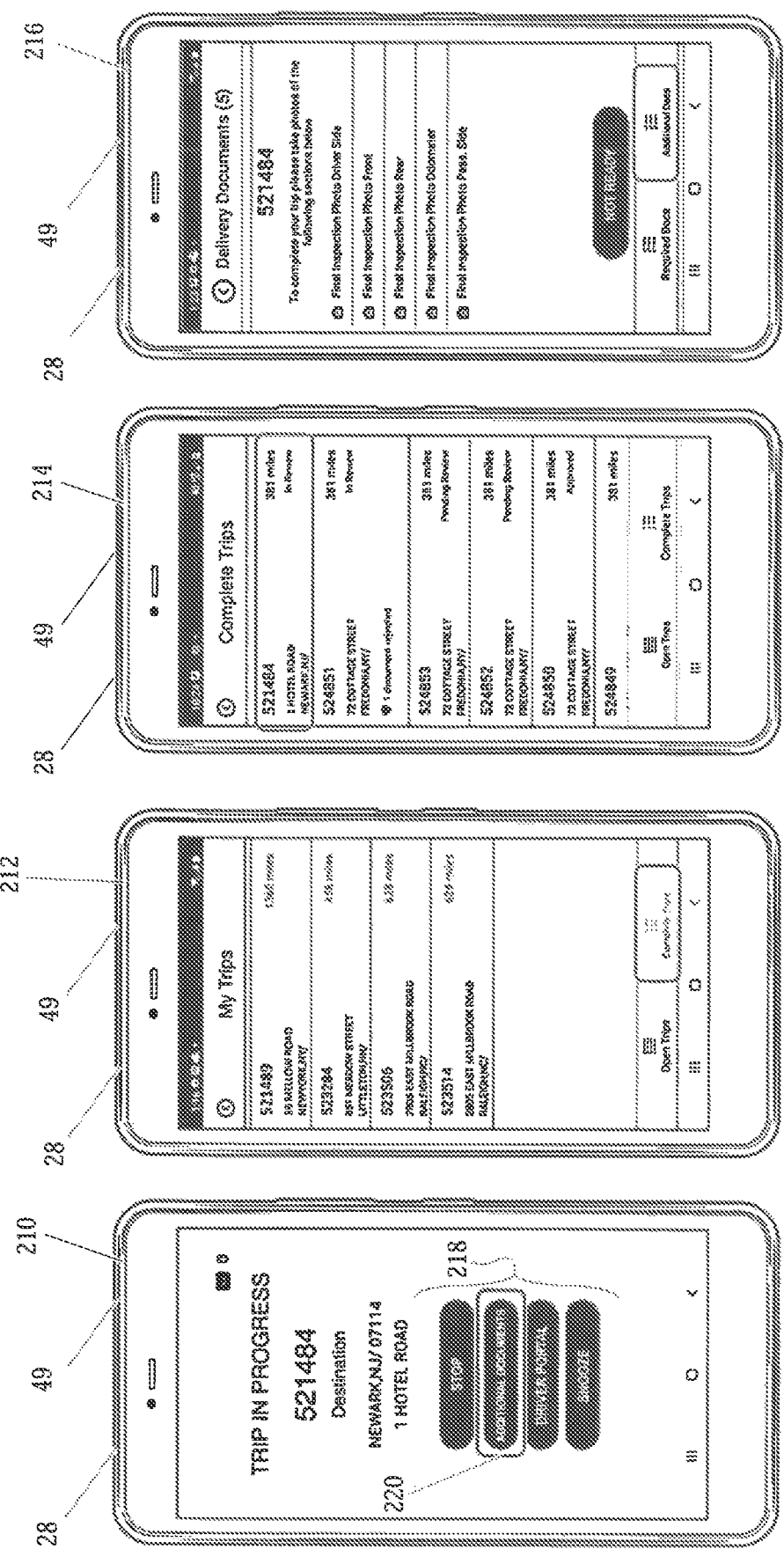
FIGS. 21, 22, 23, 24 show different screen captures of the end-user device for a driver, displaying an option to add additional documents while a trip is in progress or after a trip is completed.

FIGS. 21, 22, 23, 24 show different screen captures 210, 212, 214 and 216 of the end-user device 28 for a driver 53, displaying an option to add additional documents while a trip is in progress or after a trip is completed. Specifically, in FIG. 21, the driver 53 is presented with menu options, at 218, including an option to add documents at 220. The driver 53 is then directed to a list of the driver's 53 trips. The driver 53 may select a trip, from either completed trips or open trips, as shown in FIG. 22. After selecting completed trips, for example, the list is filtered to include only completed trips of the driver 53. After the driver 53 selects a completed trip (FIG. 23), details of the selected trip are displayed at FIG. 24 and the driver 53 may choose the option for additional documents, such as receipts, inspection documents, and settlement documents.

Figures 25, 26, 27:
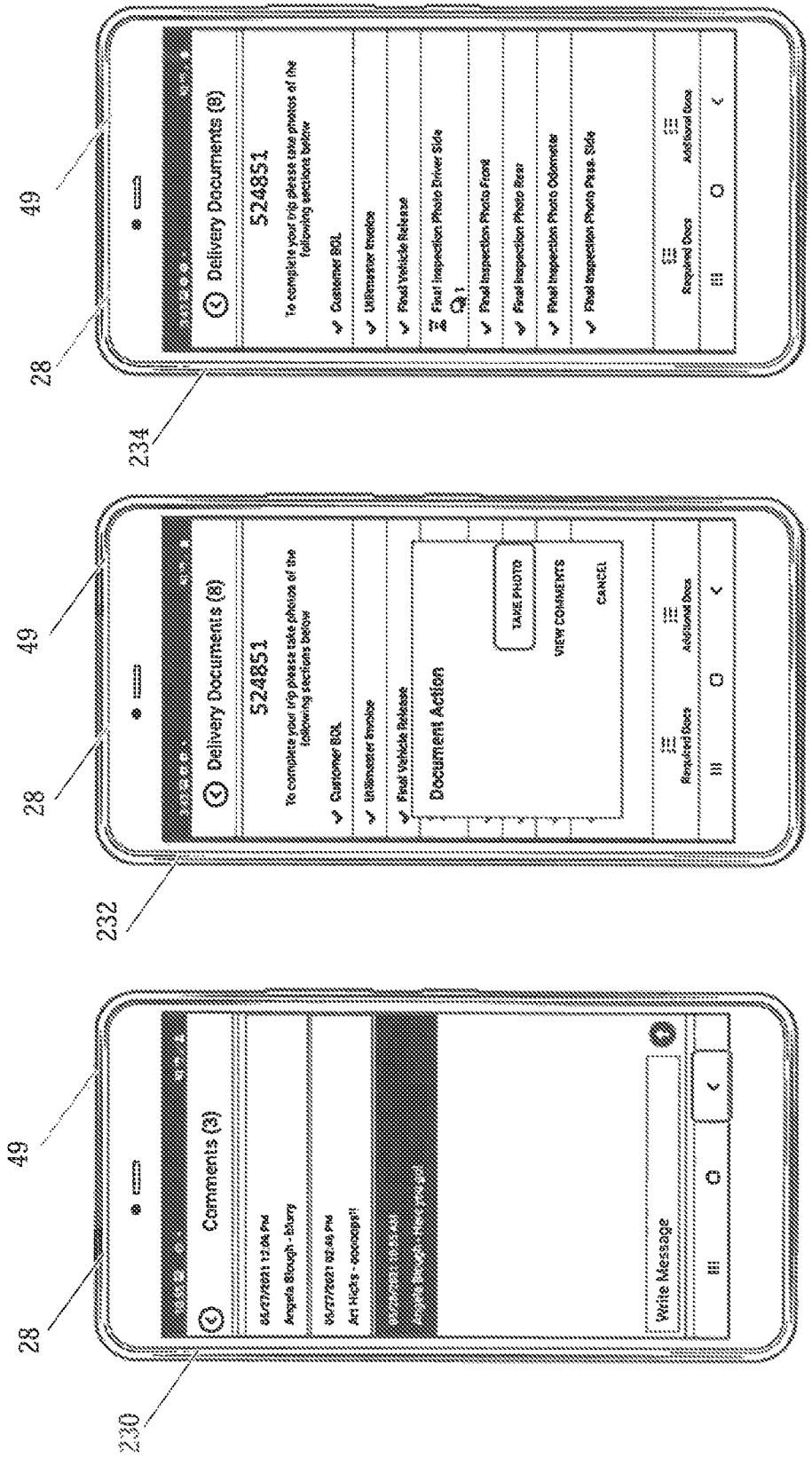
FIGS. 25, 26, 27 show different screen captures of the end-user device for a driver, displaying an option to add additional documents, including delivery documents or photos, for inspection.

FIGS. 25, 26, 27 show different screen captures 230, 232 and 234 of the end-user device 28 for a driver 53, displaying an option to add additional documents, including delivery documents or photos, for inspection. As shown in FIG. 25, the driver 53 can communicate with another user of the system regarding the submission of documents. In particular, communication regarding whether or not documents are acceptable may be communicated and the driver 53 may be prompted to submit a document again. As shown in FIG. 26, the driver 53 may take a photo from the end-user device 28 and submit it through the system. The status of the documents, with respect to acceptance or rejection, are displayed in FIG. 27.

Figures 28, 29, 30:
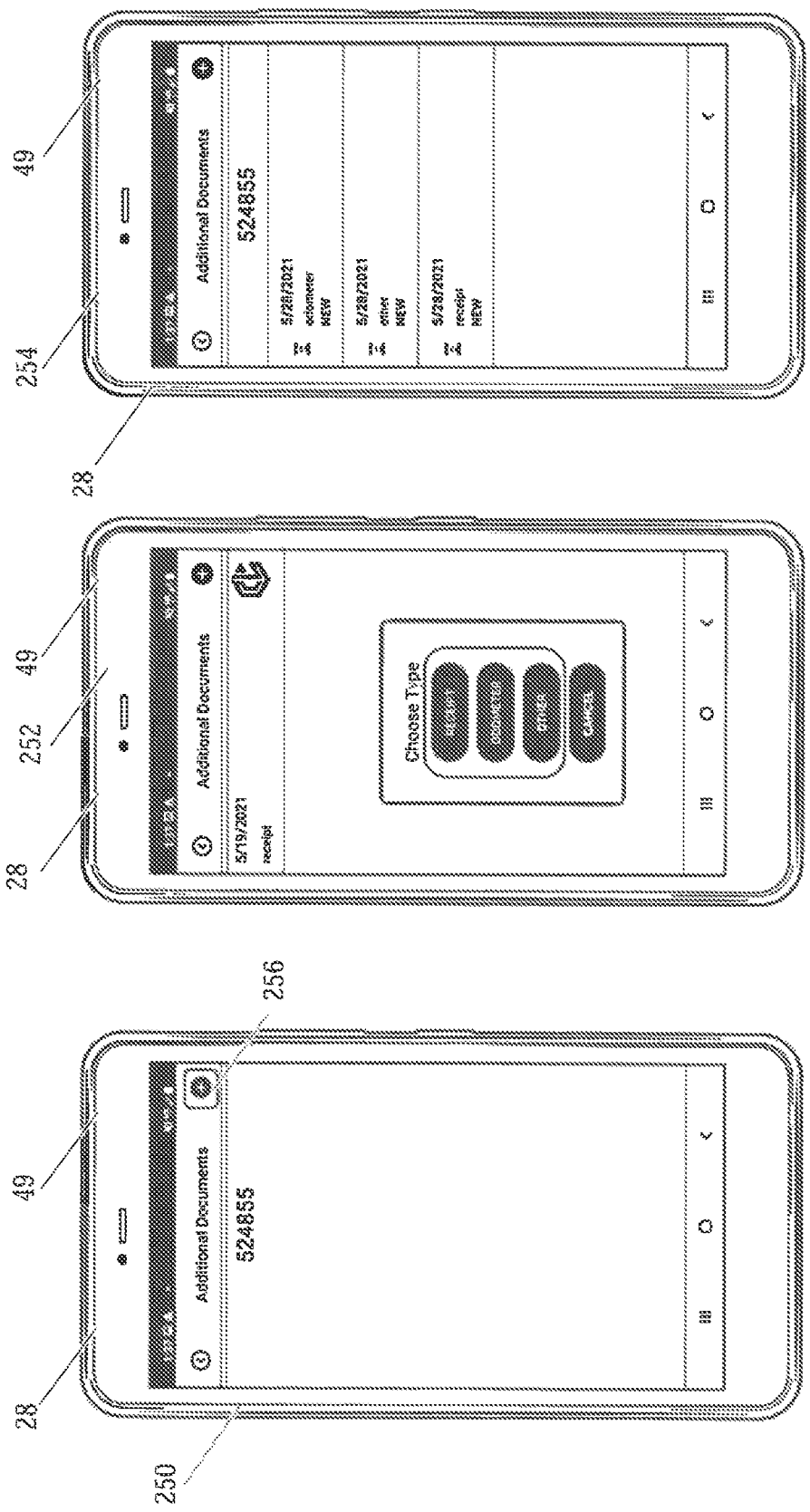
FIG. 28, 29, 30 show different screen captures of the end-user device for a driver, displaying an option for processing settlement documents, including receipts.

FIG. 28, 29, 30 show different screen captures 250, 252 and 254 of the end-user device 28 for a driver 53, displaying an option for processing settlement documents, including receipts. For a particular trip, an option may be given, such as at 256, to add documents to the trip. At FIG. 29, the type of "document" may be selected for entry, with FIG. 30 showing the line entry for each type of document.

Figures 31, 32:
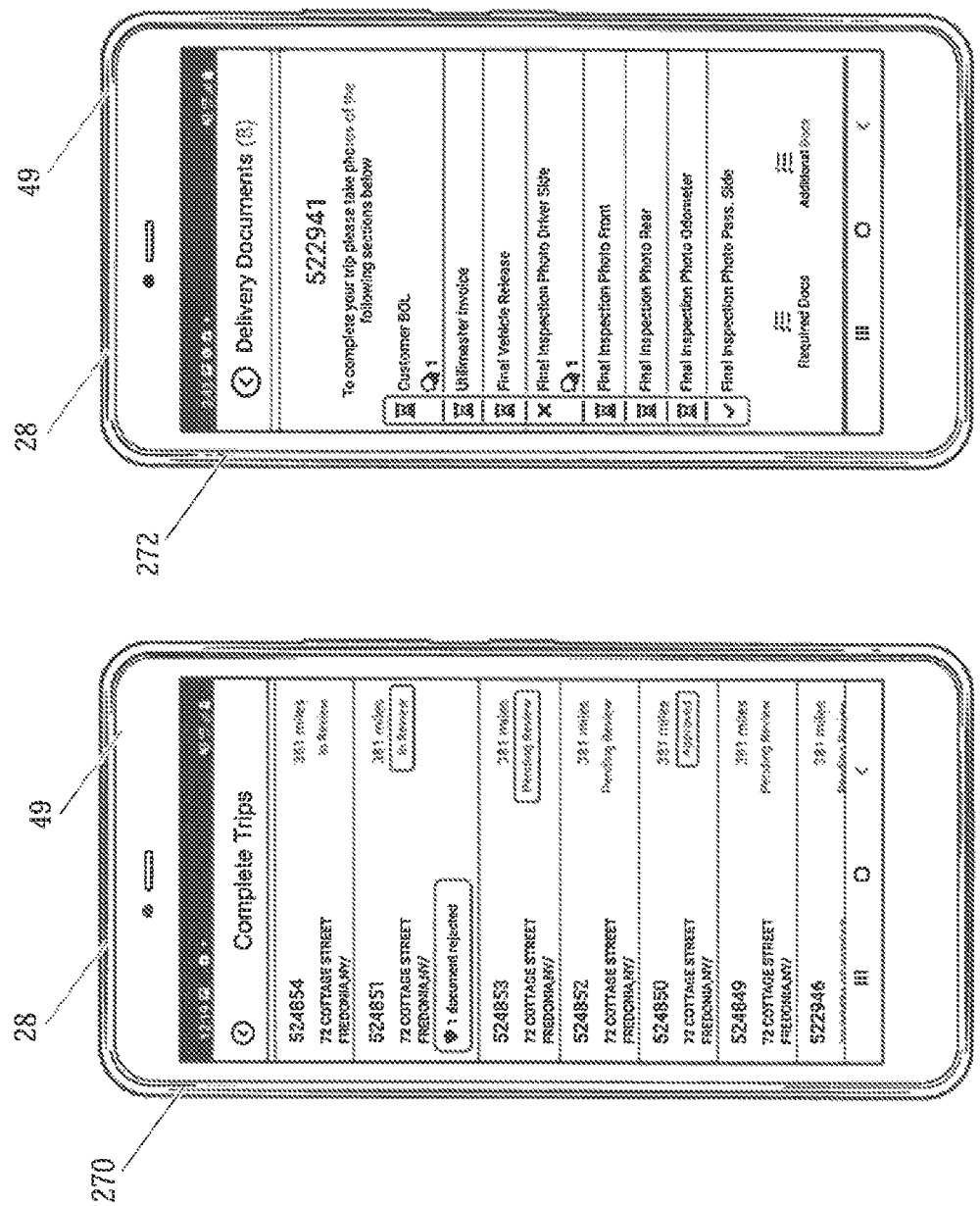
FIG. 31 shows a screen capture of the end-user device for a driver, illustrating settlement documents approval.
FIG. 32 shows another screen capture of the end-user device for a driver, illustrating settlement documents approval.

FIGS. 31 and 32 show screen captures 270 and 272 of the end-user device 28 for a driver 53, illustrating settlement documents approval. In particular, FIG. 31 shows the status of the documentation for completed trips, while FIG. 32 shows the status of document submissions for a particular completed trip.

FIGS. 33, 34, 35, 36 show different screen captures 280, 282, 284 and 286 of the end-user device 28 for a driver 53, displaying a process for completing a trip and submitting delivering documents that have been rejected. Delivery documents may be displayed after selecting a completed trip from a list of trips (FIG. 33). At FIGS. 34 and 35, a document entry that is flagged may be selected to view. Comments associated with the entry may be viewed at FIG. 36.

Figure 37:
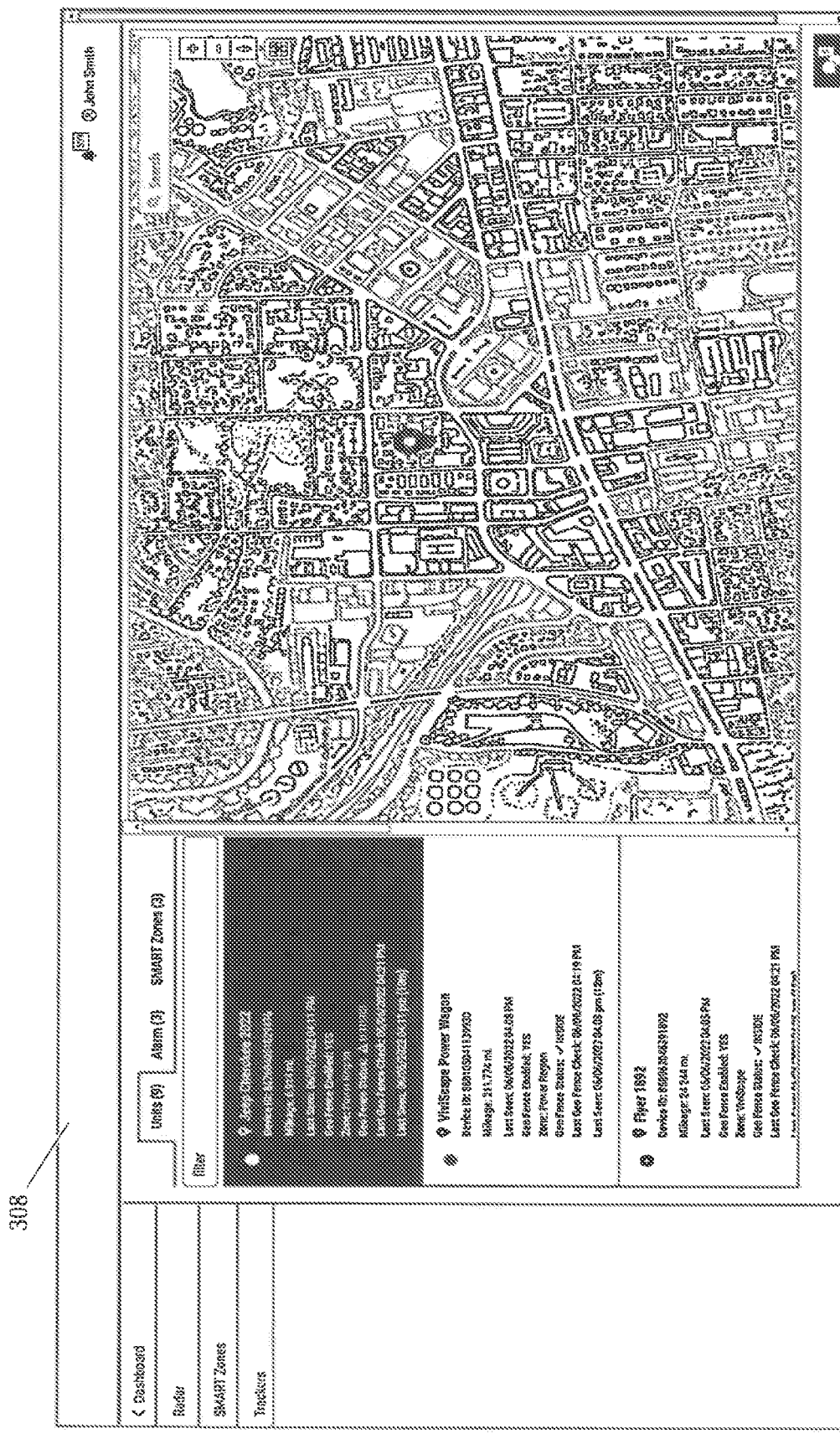
FIGS. 37, 38 and 39 show screen captures 308, 310 and 312 of the end-user device for a driver, displaying real-time tracking locations.
Figure 38:
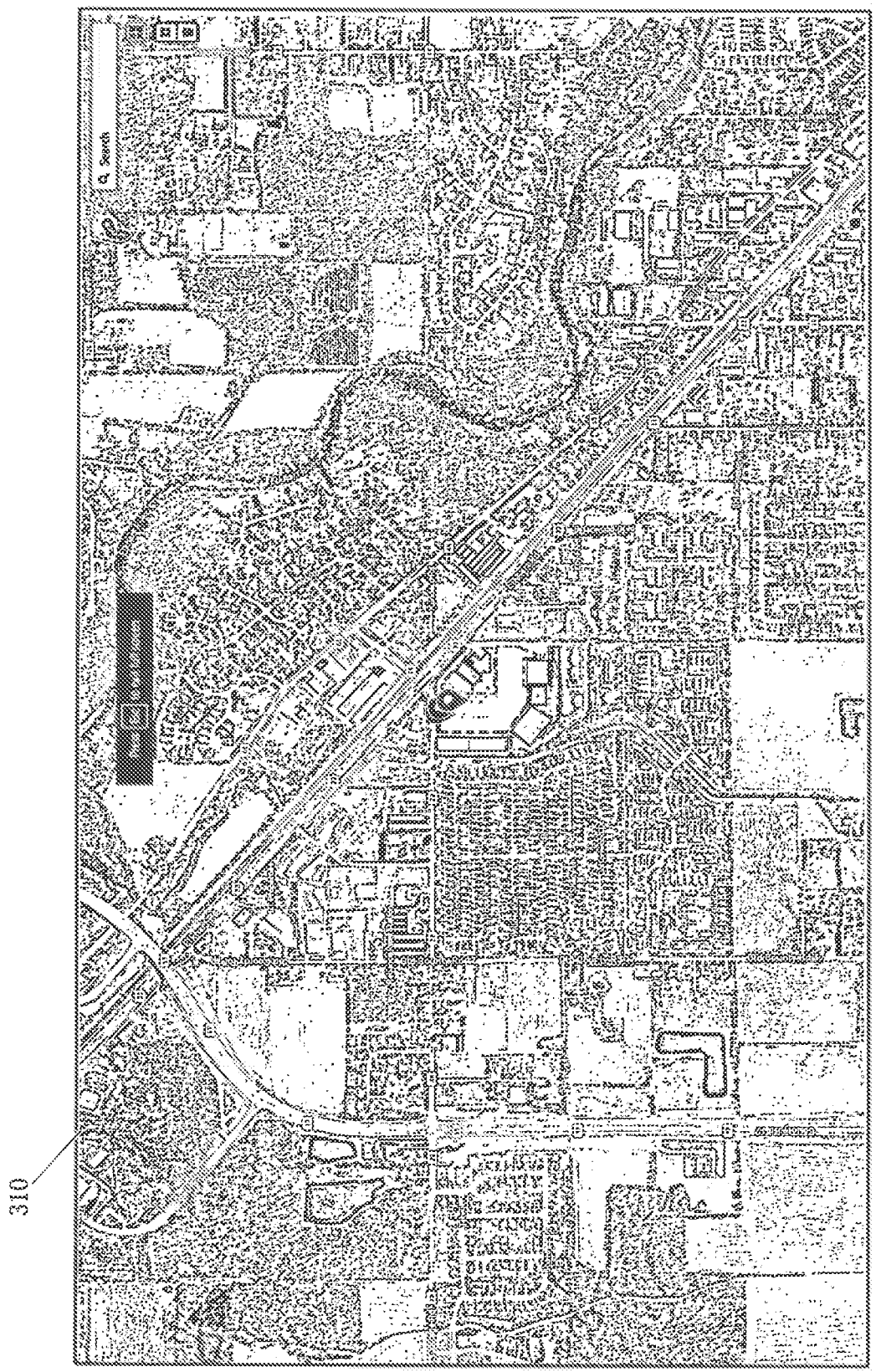
Figure 39:
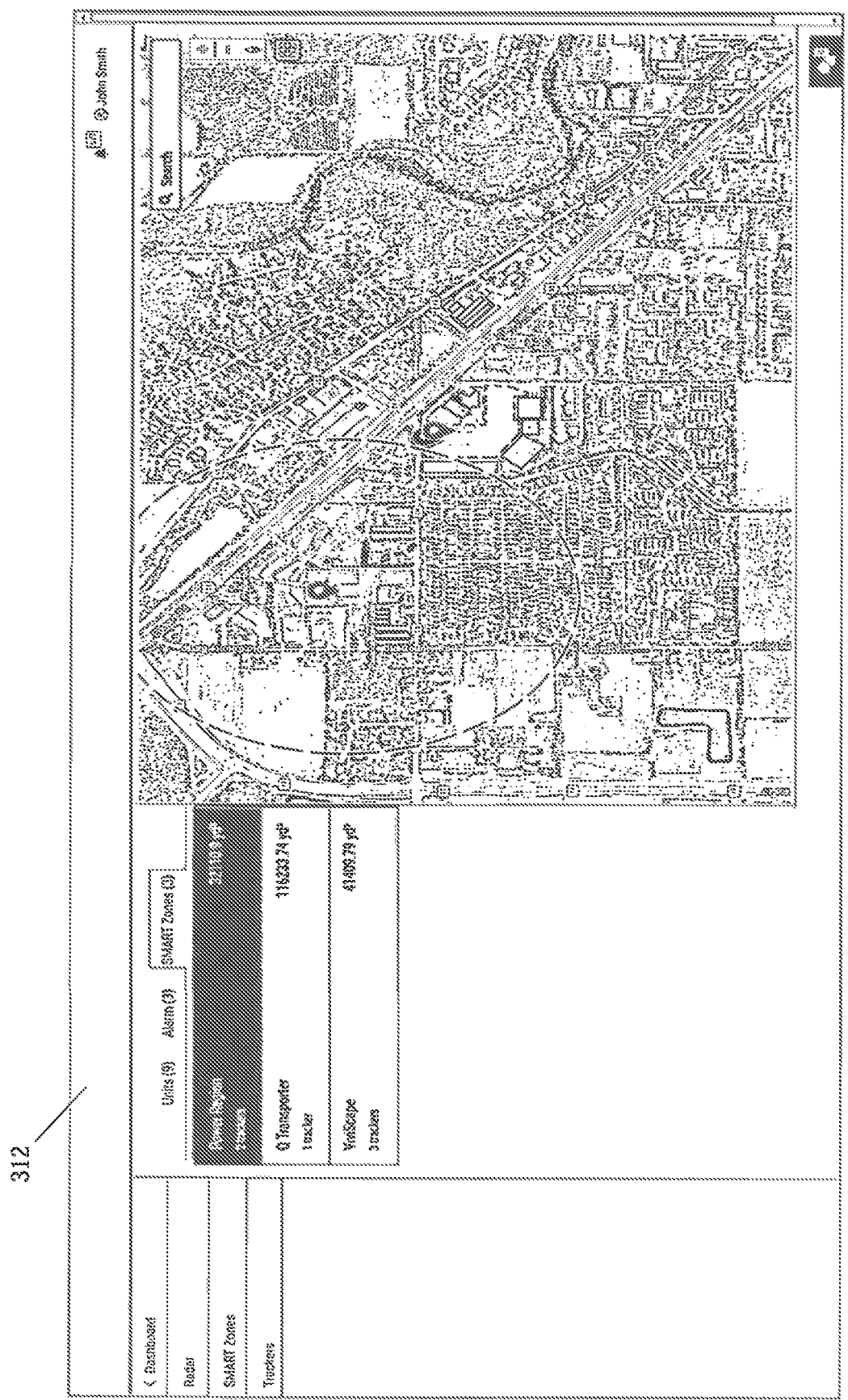

FIGS. 37, 38 and 39 show screen captures displaying real-time tracking locations on a radar 308, 310 and 312. The view on the respective radars may be toggled to show active trips, or change views using other filters. Details of particular trips may be displayed.

Figure 40:
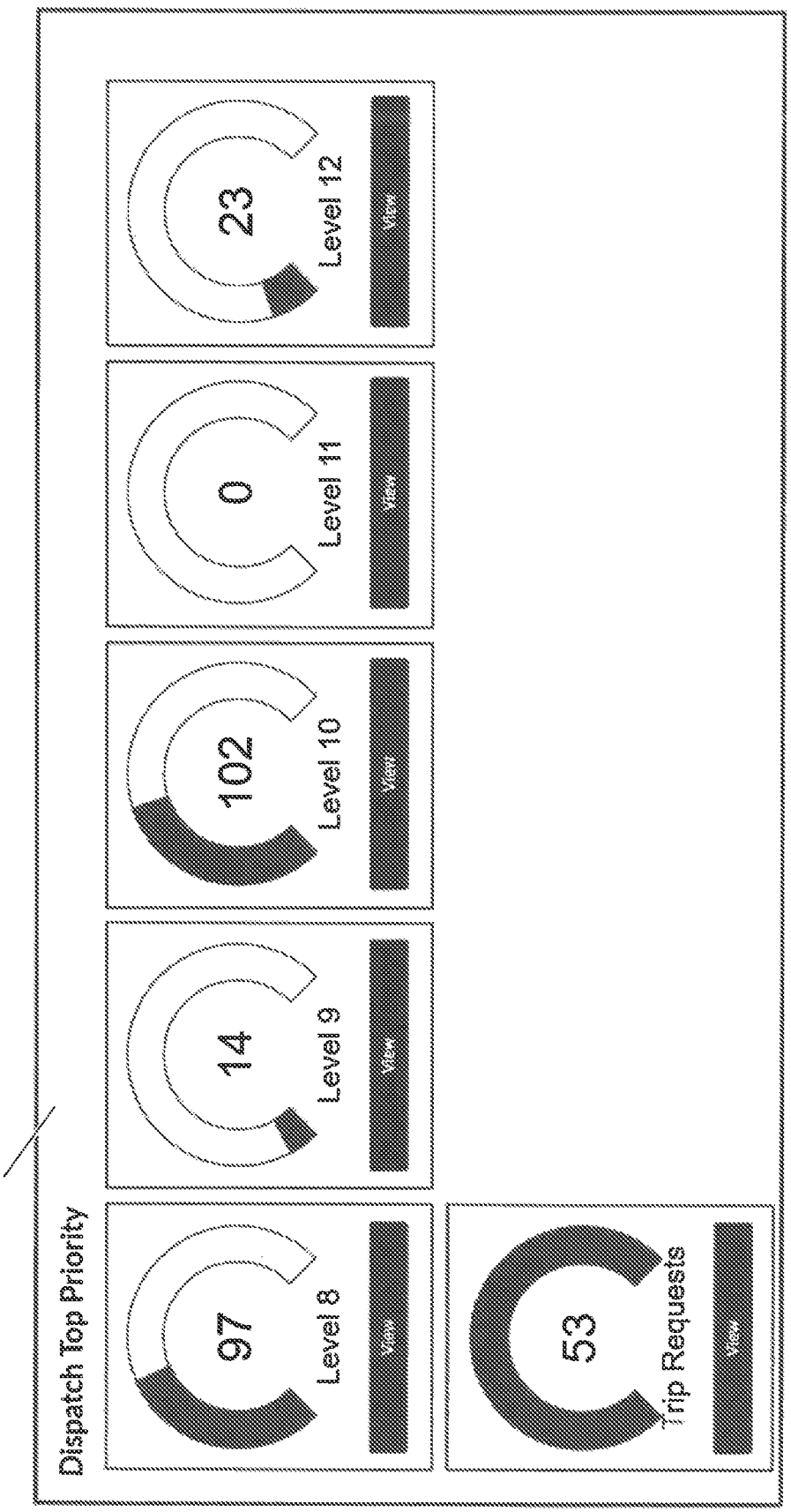
FIG. 40 shows dashboard 320, providing real-time stats.

FIG. 40 shows a screen capture 320 of the end-user device 28 for a driver 53, displaying a dashboard of real-time data generated by the present disclosure. Presents a drill down menu of various stats.

Additional modules, as used herein, may include the following:

Notification Center: A centralized hub for all emails, SMS, Push, and Chat activity throughout the platform. It provides the ability to schedule, review, and monitor communication activity across the entire system.

Rate Management: Rate management provides advanced algorithms to estimate customer charges, and driver pay based on conditional order criteria. Rates can be linked, cloned, and distributed internally and across other enterprise environments.

Report Center: Report center provides access to all the report templates used across the system. Report center also provides the ability to create documents by triggered events for customers and internal use. Scheduled reports are also available and can be distributed across multiple recipients.

Insights: Insights provides real-time, and scheduled datasets, reports, and other dashboards across the system. Datasets are available in multiple data formats for use of further data analysis and can be exported in various formats.

Unit Management: Unit management provides a quick and simple way to manage inventory for storage, tracking, and distribution of orders. Unit management also integrates with beacon 37 trackers to identify other meta data related to assets assigned to trackers.

Inventory Management: Inventory Management provides a way to manage and inspect units that customers are planning for distribution to designated consignees. Inspection includes a way to keep track of customized checkpoints, defects, and the ability to record photos and video captures diagnosing issues that may arise. This data is made available to manufacturers to mitigate issues that may occur during the manufacturing process.

Invoice Management: Provides a way to generate invoices for customers. Allows confirmation of all documentation and expenses. Including the ability to merge documents for easy distribution. Also tracks cash receipts and the deposit all invoices.

We claim:

1. A transportation management system, including:
 a back-end system controlling a display depicting real-time location tracking of a plurality of drivers, transportation vehicles, and freight using a location tracking device including a GPS utility;
 wherein a server of the back-end system executes a plurality of modules including at least:

a trip management module facilitating control of a trip, including request of the trip by a driver and assignment of the trip to the driver by the back-end system;

a driver management module facilitating—control of driver operations, including canceling the trip or abandoning a trip and notifying the driver via the end-user device;

a settlement management module facilitating settlement or completion of the trip, including submission of inspection documents of the freight or the transportation vehicle before the trip begins and after the trip has ended; and an inspection module providing a digital checklist of an inspection, including submission of a photo or video clip documenting at least one item from the digital checklist;

wherein the server uses location sensing on the photo or video clip to confirm that the photo or video clip is taken within a predetermined radius relative to a drop off location.

2. The transportation management system of claim 1, further including:

a customer portal configured to provide a particular customer with details regarding a trip or order assigned to the particular customer.

3. The transportation management system of claim 1, further including:

a driver portal configured to provide a particular driver with details regarding a trip or order assigned to the particular driver via the end-user device.

4. The transportation management system of claim 1, further including:

a dashboard configured to illustrate data relating to at least one of drivers, transportation vehicles, and freight.

5. A non-transitory computer readable storage medium having data stored therein representing software executable by a computer, the software including instructions to:

control a display depicting real-time location tracking of a plurality of drivers, transportation vehicles, and freight using a location tracking device including a GPS utility using a back-end system; and execute a plurality of modules using a server of the back-end system, wherein the plurality of modules include:

a trip management module facilitating control of a trip, including request of the trip by a driver and assignment of the trip to the driver by the back-end system;

a driver management module facilitating control of driver operations, including canceling the trip or abandoning a trip and notifying the driver via the end-user device;

a settlement management module facilitating settlement or completion of the trip, including submission of inspection documents of the freight or the transportation vehicle before the trip begins and the trip has ended; and an inspection module providing a digital checklist of an inspection, including submission of a photo or video clip documenting at least one item from the checklist;

wherein the server uses location sensing on the photo or video clip to confirm that the photo or video clip is taken within a predetermined radius relative to a drop off location.

6. The computer readable storage medium of claim 5, the software including instructions to:

provide a particular customer with details regarding a trip or order assigned to the particular customer using a customer portal.

7. The computer readable storage medium of claim 5, the software including instructions to:

provide a particular with details regarding a trip or order assigned to the particular driver via a driver portal and the end-user device.

8. The computer readable storage medium of claim 5, the software including instructions to:

illustrate data relating to at least one of drivers, transportation vehicles, and freight using a dashboard.

\* \* \* \* \*